(12) United States Patent
Derks et al.

(10) Patent No.: US 8,999,494 B2
(45) Date of Patent: Apr. 7, 2015

(54) RESINS AND COATING COMPOSITIONS

(75) Inventors: Franciscus Johannes Marie Derks, DL Heythuysen (NL); Jelle Bernandas Otto Van der Werf, AW Zwolle (NL)

(73) Assignee: DSM IP Assets B.V., Heerlen (NL)

( * ) Notice: Subject to any disclaimer, the term of this patent is extended or adjusted under 35 U.S.C. 154(b) by 218 days.

(21) Appl. No.: 13/383,663

(22) PCT Filed: Jul. 16, 2010

(86) PCT No.: PCT/EP2010/060355
§ 371 (c)(1),
(2), (4) Date: Mar. 26, 2012

(87) PCT Pub. No.: WO2011/007003
PCT Pub. Date: Jan. 20, 2011

(65) Prior Publication Data
US 2012/0183749 A1    Jul. 19, 2012

(30) Foreign Application Priority Data

Jul. 16, 2009   (EP) ..................... 09165660

(51) Int. Cl.
*C08L 77/12* (2006.01)
*C09D 177/12* (2006.01)
*C08G 69/44* (2006.01)

(52) U.S. Cl.
CPC .................. *C08G 69/44* (2013.01); *C08L 77/12* (2013.01); *C09D 177/12* (2013.01); *Y10T 428/24802* (2015.01)

(58) Field of Classification Search
USPC ........................ 428/195.1; 524/607, 514, 538; 427/427.4, 358, 429, 430.1, 428.01, 427/420
See application file for complete search history.

(56) References Cited

FOREIGN PATENT DOCUMENTS

| WO | WO 99/16810 | * | 4/1999 | ............. C08G 69/44 |
|---|---|---|---|---|
| WO | WO 00/34354 | * | 6/2000 | ............. C08G 18/60 |

OTHER PUBLICATIONS

International Search Report for PCT/EP2010/060355 mailed Oct. 29, 2010.
Written Opinion of the International Searching Authority mailed Oct. 29, 2010.

* cited by examiner

*Primary Examiner* — Robert D. Harlan
(74) *Attorney, Agent, or Firm* — Nixon & Vanderhye P.C.

(57) ABSTRACT

The invention relates to a polyesteramide resin containing ester groups and at least one amide group in the back-bone characterized in that it has at least one hydroxyalkylamide endgroup, and a Tg<0° C.

18 Claims, No Drawings

RESINS AND COATING COMPOSITIONS

This application is the U.S. national phase of International Application No. PCT/EP2010/060355 filed 16 Jul. 2010 which designated the U.S. and claims priority to EP 09165660.3 filed 16 Jul. 2009, the entire contents of each of which are hereby incorporated by reference.

The invention relates to polyesteramide resins having a Tg<0° C. and to binders comprising at least one such polyesteramide resin optionally blended with other resins, such as acrylic and polyester resins. It also relates to two component coating compositions comprising as first component a binder comprising at least one polyesteramide according to the invention and as a second component at least one crosslinking compound as a curing agent. The invention further relates to the process for making the polyesteramide resin, to the process for coating a substrate with the above two component coating composition and to substrates having adhered thereto a coating composition of the invention.

The present invention also relates to the use of the polyesteramide resin as (or in) a binder suitable for two component solvent- or water-borne coating compositions and finally the invention also includes the use of the polyesteramide resin in a coating material, adhesive or sealing composition.

There is in the coating industry a constant need for improved compliant coatings for use in different application area such as vehicle refinish, commercial vehicles, agricultural and construction equipment (ACE), rail, general industry, protective, plastics etc.

To meet high end requirements, two component compositions are in use within several coating application area. By two component composition is herein meant a combination of different coatings components which are prepared and stored separately and yet are always dealt with in conjunction with one another and which are mixed to form a coating composition just before the coating is applied. Component compositions of this kind are common, inter alia, in the preparation of topcoats or primers.

Such two component compositions can comprise, for example, a hydroxy-functional alkyd or polyester resin as a binder and a polyisocyanate as a crosslinking compound. Alternatively, a melamine/formaldehyde, phenolics or a urea-formaldehyde resin can be used for high bake/stoving coatings.

Ideally, such two component coating compositions should cure rapidly (i.e. have at least one of the following properties: short dust-dry time, a short tack free time and/or quick through-drying), while at the same time retaining processability for as long as possible (potlife).

However the disadvantage of known two component compositions may be that the drying time may be too slow and/or the hardness characteristics may be insufficient.

Furthermore, since the year 2007 new regulations require the development of new coating compositions in which the amount of volatile organic compounds (VOC) has a specific maximum value that depends on the desired application area.

However, the current acrylics or acrylic-polyester blends used for the same purpose that are VOC regulation compliant are generally soft or have a low molecular weight. When cured, the coating remains too soft or tacky for a long time due to the low Tg or to insufficient network formation. The curing reaction can be speeded up by adding more catalyst but this may unacceptably shorten the potlife and may decrease the final hardness properties as well.

Polyesteramide resins are generally known from WO 99/16810, which describes a broad class of polyesteramide resins in which all kinds of starting compounds for the synthesis of the polyesteramide resin can be chosen. The resulting polyesteramide resins from these syntheses have therefore very different properties, for example different physical properties like the molecular weight or the glass transition temperature (Tg), but also different chemical properties like for example their hydrophilic or hydrophobic character.

WO 00/34354 relates to a two component system comprising as the first component a linear or branched condensation polymer containing ester groups and at least one amide group in the backbone, having at least one hydroxyalkylamide endgroup, having a weight average molecule mass of ≥800 g/mol and having a hydroxyl value from 20 to 400 mg KOH/gram polyesteramide resin and as the second component a compound that is capable of reacting with hydroxyl groups. The Tg of the condensation polymer is from 0 to 90° C. However, such resins give a very high viscosity when formulating coatings that comply to the latest VOC regulations, making the coatings difficult to be applied to surfaces.

WO 2009-115588 relates to fatty acid modified polyesteramide resins comprising at least one component selected from α(alpha)-β(beta)-unsaturated diacids, alkanolamines and 18 to 60 wt % of fatty acids or their derivatives. A disadvantage of such resins is that the unsaturated diacids may lead to undesired side reaction and/or possible yellowing of the resin.

Polyesteramide resins can be used for example in coating compositions as part of a binder. A binder is generally defined to be the resinous part of a coating composition. The binder can generally comprise a single resin, such as the polyesteramide resin of the invention, or a mixture (blend) of more resins and optionally a low amount of a liquid medium.

It is the object of the present invention to provide a resin having improved properties which is suitable for two component coating compositions fulfilling the latest VOC regulations, having at the same time a low viscosity for ease of application of the coating composition in the form of a film, and which two component composition still results in a coating showing at least one of the following properties: good potlife, good drying properties such as a short tack free time, good hardness properties, a high solid content and a good chemical resistance.

The two component coating composition comprising the polyesteramide resin of the invention provides thus a satisfactory balance of properties of low content of volatile organic solvent at application viscosity, a fast drying speed, leading to coatings with good appearance properties and good hardness. In addition, the coating composition should also provide cured coatings exhibiting other properties such as flexibility, scratch resistance, gloss, durability, and resistance to chemicals and UV radiation.

It is an object of the present invention that such two component coating composition can be cured thermally and/or with actinic radiation (in the presence of a suitable photoinitiator or catalyst). Actinic radiation herein means electromagnetic radiation such as near infrared, visible light, UV radiation or X-rays, especially UV radiation, and corpuscular radiation such as electron beams.

Surprisingly, the desired properties as described above are achieved by a two component coating composition comprising as a first component a binder comprising at least one particular polyesteramide resin as described below and as a second component one or more crosslinking compounds as a curing agent.

According to the invention there is provided a polyesteramide resin containing ester groups and at least one amide group in the backbone, having at least one hydroxyalkylamide endgroup and a Tg<0° C.

Optionally in one particular embodiment of the invention the polyester amides of the invention may be branched (preferably hyperbranched) polyester amides.

Examples of branched (preferably hyperbranched) polyester amides are condensation polymers (optionally as entire polymers and/or partly modified polymers) that comprise at least one ester group and at least one amide group in the polymer backbone, where preferably the polymer comprises at least one end group selected from at least one of:
  a) at least one beta hydroxyalkylamide group, optionally substituted by at least one beta alkyl and/or optionally having a beta hydroxyalkylamide functionality from 2 to 250
  b) at least one carboxylic acid group connected to an alkylamide group via an ester linkage;
  c) at least one dialkylamide group connected through the polymer backbone to a unit derived from an alkylamide, the connection comprising at least one ester linkage;
  d) at least one (preferably at least two) β hydroxylamide ester groups;
  e) at least one heterocyclic end group connected to the polymer backbone through a unit derived from an alkylamide, optionally the connection comprising an optionally substituted ethylene group and/or optionally the polymer being quaternised or protonated;
  f) any combinations of end groups a) to e); where optionally the polymer
    i) has a weight average molecular mass of >800 g/mol;
    ii) has a degree of polymerisation of more than 19; and/or
    iii) comprises a polymer backbone having at least one unit comprising an amide bond attached to trismethylene amino methane group Branched polyester amides (such as those described above) may be obtained by:
  A) reacting a cyclic anhydride and an alkanolamine to form a beta-hydroxyalkylamide, after which a polyesteramide is obtained through polycondensation.
  B) reacting an alkanolamine and a cyclic anhydride after which a polymer is obtained through polycondensation.
  C) (i) contacting a hydroxy-, or aminefunctional monomer, oligomer or polymer with a first molar excess of a cyclic carboxylic acid anhydride, to form a mixture of an acid functional ester, respectively an acid functional amide and a cyclic carboxylic acid anhydride; and then
    (ii) contacting the mixture from (i) with an amount of alkanediolamine, wherein the amount is a second molar excess with respect to the first molar excess.

Branched polyester amides may be prepared by the methods described one or more of the publications below (and combinations thereof) and/or have structures as described thereto. The contents of these documents are incorporated by reference. Hydroxyl functional branched polyester amide polymers are described in WO99-016810. Carboxy functional branched polyester amide polymers are described in WO00-056804. Dialkyl amide functional branched polyester amide polymers are described in WO00-058388. Ethoxy functional branched polyester amide polymers are described in WO03-037959. Hetero functionalised branched polyester amides are described in WO07-098889. Secondary amide functional branched polyester amides are described in WO07-144189.

It was found that two component coating compositions comprising polyesteramide resins according to the invention have a low viscosity and are VOC regulations compliant. Other important feature are the distinctive hardness development properties after cure (at elevated temperature), combined with a good potlife. The polyesteramide resin also improves the final hardness of the composition. The two component composition according to the invention may also have a relatively high solids content.

A further advantage is that the coating compositions can be fully cured at low temperatures and can thus be employed for the sector of automotive refinishing. Even given the curing of the coating compositions at lower temperatures, they cure rapidly while at the same time retaining processability for a long time. Finally, when used as clearcoat material over a basecoat, the coating compositions according to the invention exhibit markedly improved adhesion to the basecoat.

The terms resin, diacid, anhydride, alkanolamine, binder, coating, crosslinking component, composition comprise herein the singular and the plural.

The acid value is generally much lower than the hydroxyl value for the polyesteramide resins according to the invention. The amount of acid groups is determined by the titration of the acid/anhydride groups by KOH. The amount of acid groups is expressed as the acid-value (AV) in mg KOH/g polyesteramide resin. The acid value of the polyesteramide resin according to the invention generally ranges from 0 to 40 and preferably ranges from 0 to 20 mg KOH/g resin.

Depending on the ratio between its components, a polyesteramide resin is obtained with a higher amount of hydroxyl end groups than acid end groups. These end groups are sometimes referred to as functional end groups. The amount of hydroxyl groups is determined by the titration of the hydroxyl groups with acetic anhydride and the back titration with KOH. The amount of hydroxyl groups is expressed as the hydroxyl-value (OH-value, OHV) in milligram KOH used per g polyesteramide resin. A generally obtained OH-value for the polyesteramide resins according to the invention is from 40 to 200 mg KOH/g. It was found that good crosslinking properties of the polyesteramide according to the invention may be obtained for an OH value from 40 to 200 mg KOH/g, more preferably from 120 to 180 mg KOH/g and most preferably from 140 to 170 mg KOH/g. If the OH value is too high, the corresponding resin will have a high crosslinking density that results in a high viscosity which is undesirable. If the OH value is too low, there will be too many molecules having only one OH group (monofunctional) or even having no OH groups (non-functional), since the OH value is directly related to the number of the OH groups in the molecules. Such resins will have a low crosslinking density, forming a weak network with lower hardness. Therefore it is highly preferred that the resin composition is substantially free of (for example contains no) molecules having less than or equal to one OH group or functionality.

The number average molecule weight (Mn) of the polyesteramide resin according to the invention is preferably Mn≤2000 g/mol, more preferably Mn≤1500 g/mol, and most preferably Mn≤1000 g/mol to ensure a low resin viscosity. More preferably the Mn is in the range from 500 to 1500 g/mol, more preferably from 500 to 1000 g/mol. The Mn value is calculated by counting the mass of the average polyesteramide resin structure, determined by the ratio of the building blocks that it comprises.

The polydispersity index (PDI) is a measure of the distribution of molecular mass in a given polymer sample. The polydispersity index can be calculated by division of the weight average molecular weight Mw by the number average molecular weight Mn. It indicates the distribution of individual molecular masses in a batch of polymers. The polydispersity index has a value which is always one or more (i.e Mw≥Mn), but as the polymer chains approach uniform chain length, the polydispersity index approaches the unity (PDI→1).

Preferably the polydispersity index of the polyesteramide according to the invention ranges from 1.3 to 2.5 and more preferably from 1.5 to 2.

The glass transition temperature (Tg) of the polyesteramide resin (as measured by DSC) is generally less than 0° C., preferably ≥−1° C., more preferably ≥−15° C. Conveniently the Tg of the polyesteramide resin range from −50 to −5° C., more conveniently from −50 to −15° C. It has been found that by having a Tg<0° C., the viscosity of the polyesteramide resin was lower.

The polyesteramide resin according to the invention has preferably in the state of 100% solids a viscosity of ≤150 Pas at 50° C. The shear rate used to measure the viscosity of the 100% polyesteramide resin of the invention is not particularly essential, as the polyesteramide resin itself has a rather constant viscosity.

Preferably, the polyesteramide resin according to the invention contains at least two groups according to formula (I):

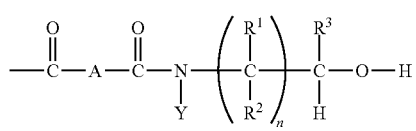

and more preferably the polyesteramide resin contains at least two groups according to formula (II):

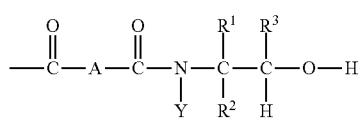

According to a further preferred embodiment of the invention, the polyesteramide resin containing hydroxyalkylamide groups is a polymer according to formula (III):

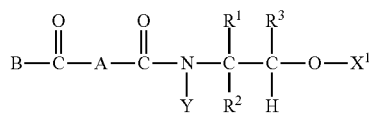

wherein for the above formula (I) to (III):
the free bond (applicable for formula (I) and (II)) extends to the polymer backbone;
A is an, optionally substituted, $(C_6-C_{24})$aryldiradical or an, optionally substituted, $(C_2-C_{24})$ (cyclo)alkyl aliphatic diradical;

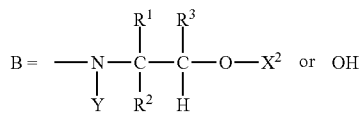

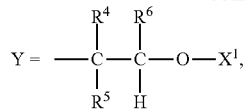

H or $(C_1-C_{20})$ (cyclo) alkyl,
or $(C_6-C_{10})$aryl;
$X^1$ is H or a group —CO—$R^7$, —CO-A-CO—N($R^8$,$R^9$), —CO-A-CO—$OR^{10}$, or —NHet;

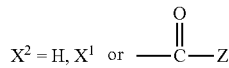

wherein Z=H, $(C_6-C_{20})$aryl or $(C_1-C_{28})$alkyl
$R^1$ to $R^6$ are, independently of each other, H, $(C_1-C_{20})$alkyl, $(C_3-C_7)$cycloalkyl or $(C_6-C_{10})$aryl;
$R^7$ is $(C_1-C_{20})$alkyl, $(C_3-C_7)$cycloalkyl, $(C_6-C_{10})$aryl, or a radical of a polymer or an oligomer;
$R^8$ and $R^9$ are, independently of each other, $(C_1-C_{20})$alkyl or $(C_6-C_{10})$aryl groups; or
$(C_1-C_{20})$alkyl or $(C_6-C_{10})$aryl groups substituted by a group containing at least one hetero atom or $R^8$ and $R^9$ together with the nitrogen atom to which they are attached form a 5 or 6 membered ring wherein optionally one or several C-atoms are replaced by —NH, —N—$(C_1-C_{20})$alkyl, —N-aryl, —O— or —S—;
$R^{10}$ is $(C_1-C_{20})$alkyl, $(C_3-C_7)$cycloalkyl or $(C_6-C_{10})$aryl, or a radical of a polymer or an oligomer;
—NHet is a mono-, bi- or multicyclic nitrogen containing heterocyclyl group attached via a nitrogen atom to the polymer which may be aromatic or partly or completely hydrogenated and may contain additional heteroatoms such as nitrogen, oxygen or sulfur and which may optionally be substituted;
n is an integer of 1 to 4, preferably n=1;
provided that no more than one of $X^1$ and $X^2$ is H, $(C_1-C_{20})$ alkyl, $(C_3-C_7)$cycloalkyl or $(C_6-C_{10})$aryl; and wherein nitrogen containing groups may be quaternized or protonated.

In one embodiment, the polyesteramide resin according to the invention comprises at least one group of the general formula (I) wherein $R^1$ to $R^6$ are H.

In another embodiment, the polyesteramide resin according to the invention comprises at least one group of the general formula (I) wherein $R^1$ $R^2$, $R^4$, and $R^5$ are H and $R^3$ and $R^6$ are methyl.

In still another embodiment, the polyesteramide resin comprise $X^1$ is H, or —CO—$R^7$, —CO-A-CO—N($R^8$,$R^9$), —CO-A-CO—$OR^{10}$, or —NHet.

In all embodiments of the invention: the term $(C_6-C_{10})$aryl denotes moieties of aromatic hydrocarbons having 6 to 10 carbon atoms, particularly phenyl, tolyl, xylyl, and naphthyl; the term $(C_6-C_{24})$aryldiradical denotes a divalent moiety of an aromatic or hydroaromatic hydrocarbon having 6 to 24 carbon atoms, particularly 1,2-phenylene, 1,3-phenylene, 1,4-phenylene, or naphthylene, tetrahydro- or hexahydronaphthylene or norbornene which may be substituted, e.g., by alkyl or alkenyl; the term $(C_1-C_{20})$alkyl denotes straight or branched alkyl groups having up to 20 carbon atoms, particularly methyl, ethyl, propyl, isopropyl, n- butyl, sec-butyl and tert-butyl; the term $(C_3-C_7)$cycloalkyl denotes cycloalkyl groups having 3 to 7 carbon atoms, particularly cyclopropyl, cyclobutyl, cyclopentyl and cyclohexyl; the ($C_1$-$C_{20}$)alkyl groups may be saturated or unsaturated; the term ($C_2$-$C_{24}$) (cyclo)alkyl diradical denotes a divalent moiety of a saturated straight or branched (cyclo)hydocarbon having 2 to 24 carbon atoms, which may be substituted by ($C_1$-$C_{20}$)alkyl or by ($C_2$-$C_{20}$)alkenyl.

In all embodiments of the invention, A may be saturated or unsaturated; preferably A is saturated. A may optionally be substituted, preferably with a ($C_1$-$C_{20}$)alkyl or by ($C_2$-$C_{20}$) alkenyl group such as methyl, octenyl, nonenyl, decenyl, undecenyl terapropenyl, tripropenyl, or dodecenyl. Suitable choices for A are ethylene, propylene, (alkyl-)1,2-ethylene, where the alkyl is defined as above, (methyl-)1,2-ethylidene, 1,3-propylene, (methyl-)1,2- cyclohexyl, (methyl-)1,2-phenylene, 1,3-phenylene, 1,4-phenylene, 2,3-norbornyl, 2,3-norbornen-5-yl, iso-butyl, tertiary butyl, tetrahydro-1,2-phenylene or (methyl-)1,2-cyclohex-4-enyl radical. Preferably, A is ethylene, propylene or 1,2-cyclohexyl.

$R^7$ can be chosen from, for example, a saturated or unsaturated ($C_1$-$C_{20}$)alkyl or ($C_3$-$C_7$)cycloalkyl, ($C_6$-$C_{10}$)aryl, a polymer or an oligomer. In all embodiments of the invention $R^7$ is preferably chosen from ($C_1$-$C_{20}$)alkyl groups or a radical of a polymer or an oligomer. Examples of suitable polymers are polyesters, polyethers, poly(capro)lactones, polyethyleneoxides, polypropyleneoxide methyl ether, polytetrahydrofuranes, polysilicones or fluoro polymers or oligomers. $R^7$ can be substituted with for example ester groups, ether groups, amide groups and alcohol groups. The polyesteramide resin may comprise the same or different $R^7$ groups.

Preferably, the $R^7$ residue having up to $C_{18}$ carbon atoms either in linear or branched form is chosen from phenyl, methyl, ethyl, propyl, isopropyl, n-butyl, sec-butyl, tert-butyl, octyl, nonyl, iso-nonyl, decyl, versatic-5 or versatic-10 or 2-ethylhexyl, or groups derived from natural fatty acids such as soyabean fatty acid, coconut fatty acid or sunflower fatty acid. If $R^7$ is a radical of a polymer or an oligomer it is preferably selected from polyethyleneoxide, polypropyleneoxide or polytetrahydrofurane.

If $R^8$ and $R^9$ are ($C_1$-$C_{20}$)alkyl groups they may be substituted by substituents optionally comprising one or more heteroatoms. More preferably, $R^8$ and $R^9$ are linear $C_2$-, $C_3$- or $C_6$-alkyl groups wherein one or several C-atoms may substituted by substituents optionally comprising nitrogen, oxygen or sulfur.

Thus, $R^8$ and $R^9$ may be substituted by a group selected from the group consisting of alcohol, ether, ester, cyanide, carbonate, urethane, urea, amide, imide, amine, imine or imidazole, oxime, sulfide, thiol, thiourea, sulfone, sulfoxide, sulfate, phosphate, phosphine, phosphinoxide, silane, silicone, silicate, fluoro, chloro, bromo or iodo groups. Examples of such groups —N($R^8$, $R^9$) are dimethylamino, diethylamino, dibutylamino, dioctylamino, ethylhexyl-methyl(or ethyl) amino, di-(2-ethylhexyl)amino, distearylamino, diallylamino, dicrotylamino, N-methyl(or ethyl)allylamino, bis (dimethyl(or ethyl)aminopropyl)amino, bis(dimethyl (or ethyl)aminohexyl)amino, bis(dimethyl(or ethyl)aminoethyl) amino, bis(trimethylsilylpropyl)amino, bis(trimethyl(or triethyl)ethoxysilylpropyl)amino, bis(perfluorooctyl)amino, bis(perfluorooctyl-methyl(or ethyl)amino, bis(methoxyethyl)amino, N-methyl(or ethyl)methoxyethylamino, bis(methoxy-2-propyl)amino, bis(maleimidohexyl)amino, bis(octenylsuccinimidopropyl)amino, bis (hexahydrophthalimidohexyl)amino, difurfurylamino, dicyano(m)ethylamino and bis(diphenylphosphinoethyl) amino.

Preferably, $R^8$ and $R^9$ are di-(($C_1$-$C_{20}$)alkyl)amino-($C_1$-$C_{20}$)-alkyl groups such as N,N-dimethylaminopropyl.

Examples of groups —N($R^8$, $R^9$) wherein $R^8$ and $R^9$ together form an N-heterocyclic ring are morpholino, thiormorpholino, piperidino, pyrrolidino, N-methyl piperazino, (2-phenyl)oxazolidino, thiazolidino, piperazino, 2,2,6,6-tetramethylpiperidino, and di(benzyl)amino.

In all embodiments of the invention —$OR^{10}$ is derived from a saturated or unsaturated hydroxy functional monomer, oligomer or polymer, wherein $R^{10}$ can be aryl, alkyl, cycloalkyl or the radical of polyethyleneoxide, polypropyleneoxide, polytetrahydrofurane, polysilicones, fluoro polymers or a nylon oligomer. Preferably $R^{10}$ is an, optionally substituted, ($C_1$-$C_{26}$)alkyl group or a radical of polyethyleneoxide. Preferably, the alkyl group is selected from the group of phenyl, methyl, ethyl, propyl, isopropyl, n-butyl, sec-butyl, tert-butyl, octyl, nonyl, iso-nonyl, decyl, versatic-5 or versatic-10 or 2-ethylhexyl or groups derived from natural fatty acids such as soyabean fatty acid, coconut fatty acid or sunflower fatty acid.

If $R^{10}$ is a radical of a polymer or an oligomer it is preferably selected from polyethyleneoxide, polyethyleneoxide methyl ether, polypropyleneoxide, polypropyleneoxide methyl ether and/or polytetrahydrofurane in particular from polyethyleneoxide methyl ether, polypropyleneoxide methyl ether and/or polytetrahydrofurane.

If the residue $X^1$ of the polyesteramide resin of the invention is built up via reaction with an acid, $R^7$ is applicable in the structure of $X^1$. If the residue is built up via alcohol, $R^{10}$ is applicable in the structure of $X^1$. The constituents of $R^7$ are also applicable for $R^{10}$.

Examples of heterocyclic compounds from which the moiety —NHet may be derived are those having a labile hydrogen atom selected from substituted or unsubstituted mono-, bi- or multicyclic heterocycles such as pyrrol, pyrazole, imidazole, pyrazolon, indole, benzimidazole, isatin, oxazolidine, 2-oxazolidone, oxindole, triazole such as 1,2,3-triazole or 1,2,4-triazole, tetrazole, pentazole, pyridazinone, barbituric acid, nucleic acids and such as cytosine, uracil, thymine or thiouracil, dioxopiperazine, chinazolinone, phthalazinone, purine, xanthin, pterin, cyclic lactames such as gamma-butyrolactam or alpha-piperidone or bicyclic amidines and derivatives thereof. Optionally such heterocyclic compounds may be completely or partly hydrogenated and may be substituted. Suitable substituents, one or several, may be selected independently from the group of alcohol, ether, ester, cyanide, amide, amine, imine, oxime, sulfide, thiol, sulfone, sulfoxide, sulfate, phosphate, phosphine, phosphinoxide, silane, silicone, silicate, fluoro, chloro, bromo or iodo groups or carbonyl groups. Most preferred are, optionally substituted, imidazole, benzimidazole, 1,2,4-triazole and hydantoin.

Polyesteramide resins according to the invention preferably comprise at least a group of the general formula (I) as defined earlier wherein $X^1$ and $X^2$ are, independently of each other, a group —CO-A-CO—N($R^8$,$R^9$), —CO-A-CO—$OR^{10}$, or —NHet; and $R^1$ to $R^6$, $R^8$, $R^9$ and —NHet are as defined earlier, wherein the nitrogen containing groups may be quaternized or protonated.

The polyesteramide resin according to the present invention may be prepared by polycondensation of a compound of the general formula (IV):

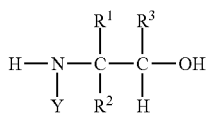

(IV)

wherein Y and $R^1$ to $R^3$ are as defined earlier.

Preferably the polyesteramide resin according to the invention comprises:
a) at least a diacid and/or anhydride;
b) at least an alkanolamine and
c) optionally at least one component providing the polyesteramide resin with functional end groups different than OH groups; and
  wherein the a):b) equivalent ratio is from 1.0:1.0 and 1.0:3.

Preferably component a) comprises (more preferably consists of) saturated and/or non-reactive unsaturated diacids and/or anhydrides. Reactive unsaturated diacids and/or anhydrides can provide undesired yellowing of the polyesteramide resin and/or side reactions.

According to a preferred embodiment of the invention there is provided a polyesteramide resin containing ester groups and at least one amide group in the backbone, having at least one hydroxyalkylamide endgroup, having a Tg<0° C. and a Mn≤2000 g/mol, wherein the polyesteramide resin comprises:
a) at least a diacid and/or anhydride;
b) at least an alkanolamine and
c) optionally at least one component providing the polyesteramide resin with functional end groups different than OH groups; and
  wherein the a):b) equivalent ratio is from 1.0:1.0 and 1.0:3, preferably about 1:3

The polyesteramide resin according to the invention therefore may have a structure which typically comprises: a) at least a diacid and/or its anhydride as building blocks; b) an alkanolamine as a branching unit and optionally component c) end-groups. By the variation of each of the above structural components a broad variation of different structures and functionalities and tailor made properties are possible.

Examples of suitable anhydrides of dicarboxylic acids a) of the formula $A(COOH)_2$, wherein A has the same meaning as in formula (I) as defined earlier, are for instance phthalic anhydride, tetrahydrophthalic anhydride, naphtalenic dicarboxylic anhydride, hexahydrophthalic anhydride, 5-norbornene-2,3-dicarboxylic anhydride, norbornene-2,3-dicarboxylic anhydride, succinic anhydride, 2-octene-1-yl-succinic anhydride, 2-nonene-1-yl-succinic anhydride, 2-decene-1-yl-succinic anhydride, 2-undecene-1-yl-succinic anhydride, 2-dodecene-1-yl-succinic anhydride, maleic anhydride, (methyl)succinic anhydride, glutaric anhydride, 4-methylphthalic anhydride, 4-methylhexahydrophthalic anhydride, 4-methyltetrahydrophthalic anhydride, maleinised poly-isobutylene, maleinised polybutadiene and the maleinised alkylester of an unsaturated fatty acid.

Examples of suitable dicarboxylic acids a) are oxalic acid, malonic acid, succinic acid, glutaric acid, adipic acid, itaconic acid, citraconic acid, isophthalic acid and terephthalic acid.

The alkanolamine b) may be a monoalkanolamine, a dialkanolamine, a trialkanolamine or a mixture hereof.

If monoalkanolamines are used in one of the possible resin syntheses, linear polymers with a functionality of 2 can be obtained. Depending on the application desired, a linear or an entirely or partly branched polymer can be chosen, in which case the degree of branching can be set via the alkanolamines chosen.

Examples of suitable monoalkanolamines include ethanolamine, 1-(m)ethyl ethanolamine, n-butyl ethanolamine, 1-(m)ethyl isopropanolamine, isobutanolamine, β-cyclohexanolamine, n-butyl isopropanolamine and n-propanolamine.

If a branched structure is desired, di- or trialkanolamines are used as the starting compound.

Examples of suitable dialkanolamines are diethanolamine (DEA), bishydroxymethylpropaneamine, 3-amino-1,2-propanediol, 2-amino-1,3-propanediol, diisobutanolamine (bis-2-hydroxy-1-butyl)amine), di-β-cyclohexanolamine and diisopropanolamine (bis-2-hydroxy-1-propyl)amine) and aminoethyl propanediol. Most preferable diisopropanolamine and diethanolamine are applied.

Suitable trialkanolamine is, for example, tris(hydroxymethyl)aminomethane.

The polyesteramide resin according to the invention may, besides the —OH groups provided by component b), furthermore optionally be modified to comprise at least one different end functional group via component c) built in the polyesteramide resin molecule via different mechanisms known in the art, depending on the type of functionality. Such end functionality may further reduce the Tg of the polyesteramide resin of the invention and allow the polarity of the resin to be modified so the resin is more soluble in various liquid media. Such end functionality may be included in the polyesteramide molecule by having for example the starting components of the polyesteramide resin of the invention themselves functionalised before being reacted to make the polyesteramide resin, or by functionalising the polyesteramide resin after its preparation. Preferred functionalities are selected from but not limited to carboxylic acid, esters, polyethylene oxide, polypropylene oxide, amines, tertiary amines, quaternary amines, cyclics, heterocyclics, phenolics and mixtures thereof. Most preferably the end functionality is an ester, According to a preferred embodiment of the invention the polyesteramide resin has at least two hydroxyalkylamide endgroups.

The polyesteramide resin according to the invention can be modified by the addition of monoacid. With "monoacid" is meant a carboxylic acid with one carboxylic acid group available for reaction with a suitable functional group on another molecule. The addition of the monoacid will result in the modification of the functional end groups present on the polyesteramide resin as prepared in the process described above.

Examples of suitable monoacids are linear or branched monocarboxylic acids with 1 to 20 carbon atoms that can be used as mixtures.

Preferably versatic-5 acid, versatic-10 acid, lauric acid or mixtures of any of them are used; more preferably benzoic acid or 2-ethyl-hexanoic acid or mixtures thereof are used.

Most preferably the acid is a fatty acid selected from the list consisting of octanoic, isononanoic, decanoic, lauric, versatic-5 acid, versatic-10 acid and mixtures thereof. It was found that the aforementioned fatty acids are especially preferred as they impart a low viscosity to the polyesteramide resin a good hardness to the coating after drying.

Examples of suitable carboxylic acids are monomeric, oligomeric or polymeric monofunctional carboxylic acids such as defined above for residue $R^7$.

Suitable carboxylic acids are, for example, saturated aliphatic ($C_1$-$C_{20}$) acids, unsaturated ($C_1$-$C_{20}$) fatty acids, aromatic acids and α,β-unsaturated acids or natural fatty acids. Examples of suitable α,β-unsaturated acids are (meth)acrylic acid, crotonic acid and monoesters or monoamides of itaconic acid, maleic acid, 12-hydroxystearic acid, polyether carboxylic acid, and fumaric acid. Suitable saturated aliphatic acids are for example acetic acid, propionic acid, butyric acid, 2-ethyl hexanoic acid, laurylic acid and stearic acid. Suitable aromatic acid are for example benzoic acid and tertiary butyl benzoic acid. Examples of natural fatty acids comprises sunflower fatty acid, coconut fatty acid or soyabean fatty acid.

Other examples of suitable acids corresponding to the $R^7$ residue are phenyl, methyl, ethyl, propyl, isopropyl, n-butyl, sec-butyl, tert-butyl, octyl, nonyl, iso-nonyl, decyl, versatic or 2-ethylhexyl or groups derived from natural fatty acids such as soyabean fatty acid, coconut fatty acid or sunflower fatty acid. Other examples of suitable alcohols are polyethyleneoxide, polypropyleneoxide or polytetrahydrofurane.

Examples of suitable alcohols corresponding to the $R^{10}$ residue for building the polyesteramide resin end functionality are ($C_1$-$C_{18}$) alcohols such as methanol, ethanol, propanol, butanol, tert-butanol, 2-ethylhexanol; fatty alcohols such as cetearyl alcohol, cetyl alcohol, stearyl alcohol, Polychol 5; and hydroxy functional polymers like polyethyleneoxide, polyethyleneoxide monomethylether, polypropyleneoxide, polytetrahydrofurane, polysilicones, fluoro polymers or a nylon oligomer. Preferably, butanol or 2-ethylhexanol are used.

Other examples of suitable alcohols corresponding to the $R^{10}$ residue can be aryl, alkyl, cycloalkyl or the radical of polyethyleneoxide, polypropyleneoxide, polytetrahydrofurane, polysilicones, fluoro polymers or a nylon oligomer. Preferably $R^{10}$ is an, optionally substituted, ($C_1$-$C_{26}$)alkyl group or a radical of polyethyleneoxide. Preferably, the alkyl group is selected from the group of phenyl, methyl, ethyl, propyl, isopropyl, n-butyl, sec-butyl, tert-butyl or 2-ethylhexyl or groups derived from natural fatty acids such as soyabean fatty acid, coconut fatty acid or sunflower fatty acid.

If $R^{10}$ is a radical of a polymer or an oligomer it is preferably selected from polyethyleneoxide, polyethyleneoxide methyl ether, polypropyleneoxide, polypropyleneoxide methyl ether and/or polytetrahydrofurane in particular from polyethyleneoxide methyl ether, polypropyleneoxide methyl ether and/or polytetrahydrofurane.

According to a further preferred embodiment the hydroxyl functional polyesteramide resin is modified to have another functionality, for example, an isocyanate functionality, an acid functionality, an amine functionality, a β-ketoacetic ester functionality or an α,β-unsaturated ester functionality. For example, the hydroxyl functional polyesteramide resin can react with an amino acid to obtain the amine functional resin.

The hydroxy functional polyesteramide resin can also react with a diisocyanate containing two or more isocyanate groups with different reactivities to obtain an isocyanate functional polymer. It is also possible, for example, that the hydroxyl functional polyesteramide resin is (trans)esterified with an acid, for example an acetoacetic acid, an acid having unsaturations such as, for example, (meth)acrylic acid or an anhydride, to obtain an α,β-unsaturated ester or a β-ketoacetic ester functionality.

The second component of the two component system has to be selected from compounds capable of reacting with said functionalities.

Suitable compounds to react with the acid functional resin are, for example, epoxy resins or polyvinyl resins having epoxy groups, adipic acid dihydrazide, polyaziridine or acid functional compounds.

Suitable compounds to react with the unsaturated ester functional resin are, for example, amines, β-ketoesters, trimethylolpropane triacrylate and glutardialdehyde.

Suitable compounds to react with the β-ketoester functional resin are, for example, (blocked) amines, and α,β-unsaturated esters.

Suitable compounds to react with the isocyanate functional resin are, for example, hydroxy or amine functional compounds.

Preferably from 20 to 80 wt % from the polyesteramide resin end groups are functionalized with component c) end groups.

The polyesteramide resin according to the invention may be in the form of a 100% solids resin or may be diluted with a liquid medium. Preferably the liquid medium is selected from the group consisting of organic solvents, water and mixtures thereof.

Preferably the mixture of the polyesteramide resin and the liquid medium has at room temperature (T=21±3° C., preferably 23° C.) a viscosity of ≤800 mPa·s, more preferably ≤600 mPa·s and most preferably ≤400 mPa·s, especially preferably ≤200 mPa·s and for example ≤100 mPa·s at a polyesteramide resin concentration of 70% solids by weight of the total mixture. Preferably the liquid medium is butyl acetate.

The present invention also relates to a solution comprising the polyesteramide resin according to the invention and at least one (organic) solvent for the polyesteramide resin. Preferably the polyesteramide resin according the invention is substantially, even more preferably fully dissolved in such solvent to give a solution. The solution according to the invention can advantageously be used, for example as part of the binder composition, to prepare coating compositions that will benefit from the addition of polyesteramide resin according to the invention.

It was surprisingly found that a solution according to the invention leads to a lower solution viscosity of the binder compared to generally known binders (in the same solution). This low solution viscosity offers the possibility to add more binder to a coating composition without giving rise to unacceptable high viscosities.

The advantage of using the polyesteramide resin according to the invention in solution is that it can more easily be combined and mixed with the other components making up the two component coating composition. In this way it is for example easier to adjust the viscosity of the polyesteramide resin containing solution so that the solution will combine better with the coating composition. It is an advantage that the viscosity can be adjusted in this way as the mixing apparatus can handle better components with viscosities in the same range.

The invention especially relates to a solution comprising at least one polyesteramide resin and a solvent, whereby the solution has a viscosity of ≤400 mPa·s at a polyesteramide resin concentration of 70% solids in butyl acetate.

Water based polyesteramide resins according to the invention can also be made by neutralisation of polyesteramide resins of the invention containing acid groups with a suitable amine and addition of water and a solvent, for example, butyl glycol. These water based polyesteramide resins can be crosslinked with, for example, water dispersed or even water soluble melamine/formaldehyde, a glycoluril resin or a water dispersable (blocked) polyisocyanate compound for example at a temperature of from 60 to 150° C. The advantage of water based polyesteramide resins according to the invention having a low Tg (below 0° C.) is that there may be less or even no need for co-solvent to be added, which is advantageous because the VOC value is further reduced in such manner.

According to the invention there is also provided a binder comprising at least one polyesteramide resin according to the invention.

The binder, which is the first basic component of a two component coating composition, may be the polyesteramide resin according to the invention, added either as a sole resin or in the form of a mixture with a liquid medium, preferably in the form of a solution. Alternatively, the binder may also be a blend of resins comprising at least one polyesteramide resin according to the invention. Such binders may be used to formulate for example water-borne coating compositions, water-dilutable coating compositions and solvent-borne coating compositions (all being two component compositions).

The blend may contain the polyesteramide resins mixed with at least another resin in all possible ratios. However, for any type of such a binder comprising the polyesteramide resin according to the invention, as a sole resin or in a blend with at least one other resin it is preferred that the resulting binder should have a viscosity of ≤400 mPas.

By combining the polyesteramide resins according to the invention with other resins, especially with polyesters and/or polyvinyl resins, to form a binder in form of a blend, the application properties of the two component coating compositions comprising such binders can be further enhanced. The addition of the acrylic can improve the color, early hardness development and increases the freedom to formulate the total resin to the specific desired application properties.

According to a preferred embodiment of the invention the polyesteramide resin may optionally be blended with a polyester resin.

The polyester resin for use in the binder blend may be obtainable by esterification of the standard diacids and diols known in the art.

The polyester resin can be prepared by known condensation and/or addition reactions of building blocks having ester-forming functional groups. Examples of ester-forming functional groups are carboxylic acid groups, (cyclic) carboxylic anhydride groups, carboxylic ester groups, hydroxy groups, epoxide groups, oxetane groups, and lactone groups. In order to form a polyester, at least a part of the building blocks used must have a functionality of at least 2. However, mono-functional and tri- or higher functional building blocks can be used as well. A generally obtained OH-value for the polyester resins according to the invention is from 40 to 300 mg KOH/g and the hydroxy functionality is at least 2. It is also preferred that the polyester resin is a branched or dendrimeric polyester. Branching is obtained by building blocks having 3 or more ester-forming functional groups per molecule.

Preferably, the hydroxy functionality is in the range of 2 to 4, more preferably 2 to 3.5.

The acid value of the polyester resin is not a particularly critical parameter, but generally ranges from 0 to 40 and ranges preferably from 0 to 20 mg KOH/gr resin.

In order to obtain a low content of volatile organic diluent in the coating composition at application viscosity, the polyester resin suitably has a number average molecular weight Mn of less than 4,000, preferably less than 2,000, more preferably less than 1,600, most preferably from 500 to 1,200. The polydispersity (Mw/Mn) of the polyester resin suitably is below 2.5, preferably below 2, and more preferably below 1.7.

According to a preferred embodiment of the invention, the polyesteramide resin may optionally be blended with hydroxyl functional polyvinyl resins that have low viscosity and which give superior hardness development properties in two component coating compositions. Preferably the polyvinyl resin is a polyacrylate resin.

Suitable monomers for preparing the hydroxyl functional polyvinyl resin are ethylenically unsaturated polymerizable monomers, such as (meth)acrylic and/or vinyl monomers. Examples of such monomers comprise: styrene, methyl styrene, vinyl styrene, (meth)acrylic acid, methyl(meth)acrylate, ethyl(meth)acrylate, propyl(meth)acrylate, acrylic amide, vinyl acetate and/or any mixtures thereof. (Meth)acrylates of cyclic alcohols, such as cyclohexyl(meth)acrylate and/or isobornyl(meth)acrylate may also be used. The hydroxyl functional polyvinyl resin may also comprise minor amounts (for example up to about 10% of polymerised units) of polyunsaturated monomers such as allylmethacrylate, ethylene glycol dimethacrylate, hexane diol diacrylate, trimethyol propane triacrylate and the like.

The hydroxyl containing polyvinyl resin blended with the polyesteramide according to the invention is obtainable by polymerising suitable monomers in an organic solvent or solvent mixture and in the presence of at least one polymerisation initiator. The organic solvents and polymerisation initiators employed are those which are customary for the preparation of polyvinyl resins.

Examples of solvents which can be used for polymerisation for polyvinyl are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol, and derivatives based on propylene glycol, for example ethyl ethoxypropionate, methoxypropyl acetate and the like, known in the art. As solvent it is preferred to employ ethoxyethyl propionate and butyl acetate.

Examples of polymerisation initiators which can be used are initiators which form free radicals, for example t-butyl perethylhexanoate, benzoyl peroxide, azobisisobutyronitrile, cumene hydroperoxide, t-butyl perbenzoate and the like. The polymerisation is preferably carried out at a temperature of from 80 to 200° C., preferably from 125 to 200° C.

The quantity and rate of addition of the initiator is preferably chosen so as to give a polyvinyl resin having a number average molecular weight Mn of from 800 to 6000 g/mol, more preferably from 800 to 4000 g/mol, and most preferably from 1000 to 2500 g/mol The polyvinyl resin obtained has preferably an OH number of from 40 to 230 mg KOH/g, more preferably from 60 to 165 mg KOH/g and most preferably from 100 to 200mg KOH/g The polyvinyl resin obtained has preferably an acid number of from 0 to 50 mg KOH/g, more preferably from 0 to 25 mg KOH/g and most preferably from 0 to 10 mg KOH/g.

With particular preference the polyvinyl resin obtained also has a glass transition temperature Tg (as calculated by the Fox equation on the basis of the monomer composition) of from —40 to +70° C., preferably from −10 to +50° C.

The polyvinyl resin employed in accordance with the invention may be mixed in any ratio with the polyesteramide according to the invention. It is customarily employed in the coating compositions in a quantity of from 10 to 90% by weight of solids of polyvinyl and polyesteramide resins (calculated excluding the liquid component such as the solvent), based on the overall weight of the coating composition (including the liquid component).

According to another preferred embodiment of the invention, the polyesteramide resin may optionally be blended with at least a polyester resin and a hydroxyl functional polyvinyl resin.

According to the invention there is provided a two component coating composition comprising as a first component a binder comprising said polyesteramide resin and as a second component at least one crosslinker compound that is capable of reacting with hydroxyl groups or with other functionalities comprised in the polyesteramide resin.

The separate components of the two component composition can be mixed and applied to form a film at temperatures of from 20 to 180° C.

The two component coating composition comprising the polyesteramide resin according to the invention may be used and applied with or without a volatile organic solvent. A volatile organic solvent is not needed in particular when low molecular weight binders, optionally in combination with one or more reactive diluents, are used.

Preferably, the two component coating composition comprising the polyesteramide resin according to the invention comprises less than 500 g/l of volatile organic solvent based on the total composition, more preferably less than 480 g/l, and most preferably 420 g/l or less.

The non-volatile content of the two component coating composition comprising the polyesteramide resin according to the invention, usually referred to as the solid content, preferably is higher than 50 wt % based on the total composition, more preferably higher than 54 wt %, and most preferably higher than 60 wt %.

Preferably the solids content of the two component coating composition is preferably within the range of from 50 to 100 wt % and more preferably from 55 to 80 wt % of the total coating composition, such that the VOC of the two component compositions or of formulations comprising such two component compositions amounts 420 g/l or less.

The first component of the two component coating composition according to the invention is the binder as previously described.

Furthermore, the two component coating composition according to the invention also comprises at least one crosslinking compound capable of reacting with hydroxyl groups or with other functionalities comprised in the polyesteramide resin.

The composition according to the invention can comprise one or more than one crosslinkers. The one or more crosslinker compounds can be chosen depending on the nature of the polyesteramide resin of the invention or other resins in the binder. A suitable crosslinker when the binder consists only of one or more polyesteramide resins, is for example an internal blocked isocyanate-based crosslinker.

Suitable crosslinker compounds capable of reacting with hydroxyl groups are, for example, compounds containing an isocyanate group, for example a diisocyanate, compounds containing a methylolamine group, compounds containing an anhydride group compound containing a silane group, and compounds containing an epoxy group. Suitable compounds containing a methylolamine group are, for example, melamine, urea, benzoguanime resins or an polyvinyl resin having N-methylolamide groups.

The diisocyanate can be a compound containing two or more isocyanate groups with different reactivities, for example an aliphatic diisocyanate with one sterically more accessible isocyanate group bound to a primary carbon atom and one sterically less accessible isocyanate group bound to a tertiary carbon atom.

Suitable isocyanate-functional crosslinkers for use in the coating composition are isocyanate-functional compounds comprising at least two isocyanate groups. Preferably, the isocyanate-functional crosslinker is a polyisocyanate, such as an aliphatic, cycloaliphatic or aromatic di-, tri- or tetra-isocyanate. Examples of diisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, [ω],[ω]'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate (Desmodur(R) W), toluene diisocyanate, 1,3-bis(isocyanatomethyl)benzene, xylylene diisocyanate, [α],[α],[α]',[α]'-tetramethyl xylylene diisocyanate (TMXDI(R)), 1,5-dimethyl-2,4-bis(2-isocyanatoethyl) benzene, 1,3,5-triethyl-2,4-bis(isocyanato-methyl)benzene, 4,4'-diisocyanato-diphenyl, 3,3'-dichloro-4,4'-diisocyanato-diphenyl, 3,3'-diphenyl-4,4'-diisocyanato-diphenyl, 3,3'-dimethoxy-4,4'-diisocyanato-diphenyl, 4,4'-diisocyanato-diphenyl methane, 3,3'-dimethyl-4,4'-diisocyanato-diphenylmethane, and diisocyanatonaphthalene. Examples of triisocyanates include 1,3,5-triisocyanatobenzene, 2,4,6-triisocyanatotoluene, 1,8-diisocyanato-4-(isocyanatomethyl) octane, and lysine triisocyanate. Adducts and oligomers of polyisocyanates, for instance biurets, isocyanurates, allophanates, uretdiones, urethanes, and mixtures thereof are also included. Examples of such oligomers and adducts are the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, the adduct of 1 molecule of pentaerythritol to 4 molecules of toluene diisocyanate, the adduct of 3 moles of m-[α],[α],[α]α,[α]'-tetramethyl xylene diisocyanate to 1 mole of trimethylol propane, the isocyanurate trimer of 1,6-diisocyanatohexane, the isocyanurate trimer of isophorone diisocyanate, the uretdion dimer of 1,6-diisocyanatohexane, the biuret of 1,6-diisocyanatohexane, the allophanate of 1,6-diisocyanatohexane, and mixtures thereof. Furthermore, (co)polymers of isocyanate-functional monomers such as [α],[α]'-dimethyl-m-isopropenyl benzyl isocyanate are suitable for use.

Typically, a cure-promoting catalyst is utilized in conjunction with the isocyanate crosslinking or curing agent. Preferred catalysts are for example organometallics, suitably dibutyl tin dilaurate, dibutyl tin di-2-ethylhexoate, zinc octoate, zinc napthenate, vanadium acetyl acetonate, bismuth or zirconium acetyl acetonate, in an effective curing amount. Such catalysts are optional, for example, elevated temperature and/or time can suffice to cure the composition. Other preferred suitable catalysts are tertiary amines.

The general synthesis of polyesteramide resins is known in the state of the art, for example from WO 99/16810.

According to the present invention there is provided a process for making a polyesteramide resin according to the invention, comprising a first step of reacting by any known method at least a diacid and/or anhydride (component a)) with at least a dialkanolamine (component b)); and a second step the polycondensation reaction wherein polycondensation of the AB2 type monomers takes place. By AB2 type of structure herein is meant that at least two building blocks corresponding to component b) correspond to one building block being component a).

Before or after the second step of the polycondensation reaction, component c) resulting in end groups as described above may optionally be added to take part at the polycondensation.

The first step in the polycondensation process according to the invention is performed at a temperature that is suitable for the components to react, therefore the temperature can vary when using different starting components. However the person skilled in the art can easily, by routine experimentation, determine the best temperature or temperature range. A generally suitable temperature range is from 20 to 140° C. Preferably a temperature of from 40 to 100° C. is used. The temperature for the second step will also depend on the components chosen and can also easily be determined by the skilled person. A suitable temperature range will be from 120 to 180° C., preferably from 130 to 170° C. Optionally in a last step end groups c) are incorporated under the same conditions.

The polyesteramide resin can, for example, be obtained in another procedure by mixing a cyclic anhydride and/or its diacid first with the end group components and next an alkanolamine, at a temperature of from 20 to 100° C., to form a β-hydroxyalkylamide, after which, preferably at a temperature of from 120 to 250° C., a polyesteramide resin is obtained through polycondensation with water being removed through distillation.

The removal of water through distillation can take place at a pressure of for example 1 bar, in a vacuum or azeotropically. Preferably the removal through distillation takes place azeotropically. Suitable solvents to remove the water azeotropically are xylene, toluene, methyl cylcoheaxne, cyclohexane, methelcyclopentane, and methylisobutylketone. When the desired AV has been reached the solvent can be removed by vacuum distillation.

The (acid and/or anhydride):alkanolamine (i.e. a):b)) equivalent ratio is generally from 1.0:1.0 to 1.0:3. Preferably, this ratio is from 1:1.2 to 1:2 and more preferably, from 1:1.3 to 1:2. These ranges were found to be advantageous for controlling the molecular weight (Mn) of the polyesteramide resin of the invention, since polymers having too low Mn will not comprise amide and ester groups, and polymers with too high an Mn will have too high a viscosity.

The polyesteramide resin according to the invention can also be obtained via a reaction between an alkanolamine, as for example described above, and a compound containing one acid group and one activated acid group instead of the anhydride compound a), after which a polyesteramide resin is obtained through polycondensation.

Examples of suitable compounds containing one acid group and one activated acid group are alkyl esters, such as, for example, mono (m)ethyl adipate and mono (m)ethyl sebacate, anhydrides and thioesters.

In addition to β-hydroxyalkylamide groups, the polyesteramide resin may also contain carboxyl groups, in amounts of from 0.01 to 2.0 mg equivalent/gram of resin.

The number of carboxylic acids present in the polyesteramide resin can be controlled via the anhydride/alkanolamine ratio and via the degree of conversion. If an alkanolamine excess is used and the reaction is almost complete, less than 0.2 mg equivalent acid/gram of polyesteramide resin is usually present. If carboxyl groups are present, they may in a subsequent step react with compounds containing one or more groups that can react with carboxylic acid, such as for example epoxy groups or β-hydroxyalkylamide groups. The amount of carboxylic acid is preferably as low as possible, for example from 0.01 to 0.2 mg equivalent/gram of polyesteramide resin.

Another way to incorporate carboxylic functionality into the polyesteramide resin is to react an OH-functional polyesteramide resin with an anhydride wherein by ring opening of the anhydride a carboxylic ester functionality is produced.

The degree of branching and the functionality of the polyesteramide resin are dependent on the starting materials and the molecular weight of the polyesteramide resin. The polyesteramide resin according to the invention is preferably a low functional polymer with a functionality of ≤6, more preferably ≤5. Most preferably the functionality of the polyesteramide resin of the invention of the invention is in a range from 2 to 4. If the functionality is too high, then the molecular weight (Mn) will also be too high, resulting in a resin having too high a viscosity and too high a cross-link density. If the functionality is less than two, this will prevent growth of the resin (act as chain stopper) as the monomers will not react and not be incorporated into the network.

By functionality herein is meant the reactive groups including but not limited to the OH groups, acid groups and amine groups. A molecular weight higher than 1000 and the use of di-and/or trialkanolamines generally lead to highly branched structures with a functionality of >10.

The polyesteramide resin according to the invention can be obtained through polycondensation of mono-and/or bis-hydroxyalkylamides of bivalent carboxylic acids.

Due to side reactions during the preparation of the polyesteramide resin it is possible that the resin according to the invention comprises also for example secondary amine groups having the formula:

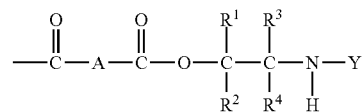

wherein A, Y, $R^1$, $R^2$, $R^3$ and $R^4$ are the same as previously described.

Preferably $R^1$, $R^2$, $R^3$ and $R^4$ are, independently of one another, the same or different, H, $(C_6\text{-}C_{10})$aryl or $(C_1\text{-}C_8)$ (cyclo)alkyl radical.

Due to side reactions during the preparation of the polyesteramide resin it is possible that the resin according to the invention comprises also for example tertiary amine groups having the formula:

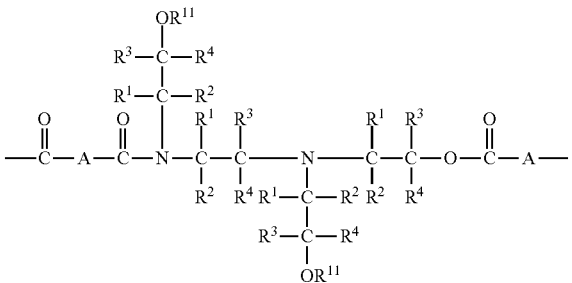

wherein A, $R^1$, $R^2$, $R^3$, $R^4$ are as defined above and $R^{11}$=H or $X^1$ (as previously described).

In general, the two component coating composition comprising the polyesteramide according to the invention may further be formulated to generally comprise, next to the two component coating composition, i.e. the binder and the crosslinking compound with optionally a suitable catalyst, also various other components like for example pigments, colorants, additives, flow promoters, degassing agents, rheology improvers, fillers and solvents. The number and nature of the various components needed for the final coating composition (also referred sometimes as formulation) depends on the final use of such coating composition. For example a powder coating composition will not include a solvent and a clear coat composition will generally not include a pigment.

Herein by coating material it is meant the two component composition as well as formulations comprising the polyesteramide resin according to the invention. The coating materials can be used with room temperature cure or at elevated temperature.

Depending on the presence of pigments and other conventional compounds, the described coating materials can be used as a colored topcoat and or clearcoat. The coating materials can be further employed as fillers and for producing pigmented basecoats or as clearcoats in a process for producing a multicoat paint system (basecoat/clearcoat process); or as a primer or primer-surfacer. The coating materials according to the invention are preferably employed for the production of topcoats.

If the coating materials according to the invention are employed as pigmented basecoats, then they can be coated over with the coating materials according to the invention which contain no pigments or are pigmented only with transparent pigments, but can also be coated over with conventional clearcoats based on organic solvents, with aqueous clearcoats or else with powder clearcoats. Preferably, however, the coating materials according to the invention are employed as clearcoats.

When the composition is used as a clearcoat, it is applied over the colorcoat which can be dried to a tack-free state and cured or flash-dried for a short period before the clearcoat is applied. In that case, the clear coat forms the top layer of a multi-layer lacquer coating such as typically applied on the exterior of automobiles. The base coat may be a water borne base coat or a solvent borne base coat. The colorcoat/clearcoat finish is then baked to provide a dried and cured finish.

The invention also relates to a substrate and/or an article fully or partially coated with a coating material comprising the polyesteramide resin according to the invention. In the following by substrate it is meant a two-dimentional surface as well as a tridimensional article.

The choice of substrate is not particularly critical and will generally depend on the future use of the substrate, therefore both organic and inorganic substrates can be used. Examples of substrates are wood, carton, paper, leather, cork, metal, plastic, composite material, corrugated cardboard, fiberboard, glass, ceramics, stone, concrete, synthetic material or another coating layer. The other coating layer can be comprised of the coating composition of the current invention or it can be a different coating composition. Thermoset and thermoplastic polymeric substrates may also be used.

Preferably, the substrates are used as components to fabricate automotive vehicles, including but not limited to automobiles, trucks, and tractors. The substrates can have any shape, but are preferably in the form of automotive body components, such as bodies (frames); body panels including roofs, hoods, doors, and fenders; heavy metal rocker areas, bumpers, and/or trim for automotive vehicles.

The substrate or article coated with a coating material comprising the polyesteramide resin according to the invention will generally undergo some form of physical, thermal or radiation curing.

The applied coating materials can be cured very effectively at a temperature of, e.g., from 0 to 60° C. If so desired, the coating materials may be cured at even higher temperatures, e.g. at a temperature in the range of 60 to 150° C. Curing may be carried out at an elevated temperature for example by the use of an oven, such as a gas oven or an electric oven, or (near) infrared radiation. The curing can be effected to take place in one step or it is possible to use two or more steps of curing. When two or more steps are used it is possible that in each step the same technique is applied or it is possible that different techniques are used, for example a combination of thermal curing in combination with radiation curing. Before curing at elevated temperature the applied coating composition may optionally be subjected to a flash-off phase.

In new car (OEM) applications, the composition may typically be baked at 100 to 150° C. for about 15 to 30 minutes to form a coating about 2.5 to 75 microns (0.1 to 3.0 mils) thick.

The coating materials comprising the polyesteramide resin according to the invention may also be used for curing at room temperature of for example: primers, protective and maintenance coating applications that do not need elevated temperatures for curing, such as bridges, pipelines, derricks, industrial plants or buildings, oil and gas installations, or ships. The compositions are particularly suitable for finishing and refinishing automobiles and large transportation vehicles, such as trains, trucks, buses, and airplanes, and for agricultural and construction equipment (known as ACE).

The coating materials can be employed both for the production-line finishing and for the refinishing of car bodies. They are preferably employed, however, in the refinishing sector. Refinishing of vehicles is the process of applying a coating composition to an already painted motor vehicle (including motor cycles). Refinishing is usually necessary after a vehicle, particularly motor cars, has been involved in an accident or sometimes to hide the effects of age.

The desired coating compositions is preferably also suitable for stoving applications in which small or large parts of automotives are cured by stoving at temperatures of less than 120° C., preferably less than 80° C. and most preferably less than 60° C.

It is to be understood that the term coating composition as used herein also includes its use as adhesive or a sealing composition.

The invention will be elucidated with reference to the following non-limiting examples.

Experimental Techniques

Molecular Weights

The molecular weights referred to in this application (Mn) are calculated as described in the description Viscosity The viscosity values of the polyesteramide resin may be measured with a Physica MCR 301 rheometer using a cone/plate measuring system characterised by a cone diameter of 25 mm and a cone angle of 1°, at a temperature of 50° C.

The viscosity values of resin diluted in butyl acetate have been measured with a Brookfield LVDV-II-PRO viscosity meter at 23° C., using spindle 61 at 10 rpm.

The viscosity values measured with DIN cup test are used to determine the flow viscosity of paints, vanishes and similar products by use of the DIN cup 4 mm viscosity meter (DSM internal method WA 101, derived from DIN 53211-87).

Glass Transition Temperature (Tg)

Tg described herein is measured by differential scanning calorimetry (DSC) using a Mettler Toldeo DSC 821 apparatus. The closed DSC cup is heated and cooled at a rate of 5° C. per minute. Measurement is performed over temperature range of from −70° C. to 100° C., based on the standard method described in ISO 11357-2)

VOC

Determination of VOC was done as following: first measure specific weight of the paint (kg/m3); then the solid con tent (%) was measured and then the VOC was calculated according to the formula:

VOC in g/l=((100−solids content)*density)/100

Alternative method to determine VOC: ISO 11890-1: 2000 (E).

The density of the compositions was measured according to ISO 2811-2: 1997(E).

The method to determine the % volatile was according to ISO 3251: 1993(E).

Potlife

Potlife test is defined to determine the workability in terms of viscosity of a two component resin after the two components have been mixed. (DSM internal testmethod WA 106). In a jar 100 ml grams of the components is mixed at 23° C. Viscosity is measured in seconds using a Din Cup 4 viscosity meter.

Hardness

Pendulum König hardness is determined as described in DIN 53157/1-87 were a coated glass substrate is measured as numbers of oscillation, multiplied by 1.4 as damping period in seconds.

Tackiness

Directly after a curing period of 30 minutes at 50° C. the thumb or palm of the hand gently touches the surface of the film. The degree of tackiness is determined as completely tack free to a wet film (marked as 0 to 5), DIN53230. The value 0 corresponds to completely tack free coating, value 1 to very slightly tacky, value 2 to slightly tacky, value 3 to tacky, value 4 to very tacky and value 5 to wet film.

EXAMPLE 1

Preparation of Polyesteramide Resin 1 According to the Invention

Hexahydrophthalic anhydride (216 g), di-isopropanol amine (366 g), lauric acid (304 g) and versatic-10-acid (186 g) were added to a reactor and heated to 150 C, where reduced pressure was gently applied to remove water and allow the mixture to react. After approximately six hours the mixture was cooled to 100, and then butyl acetate was added to dilute the polyester amide resin to 70% solids by weight. The acid value of the polyester amide resin was determined to be less than 3 mg KOH/g.

EXAMPLE 2

Preparation of Polyesteramide Resin 2 According to the Invention

Hexahydrophthalic anhydride (241 g), di-isopropanol amine (409 g), lauric acid (211g) and versatic-10-acid (186 g) were added to a reactor and reacted as described in Example 3 to obtain a polyester amide resin (70% solids) which had an acid value less than 3 mg KOH/g.

COMPARATIVE EXAMPLE A

Preparation of Polyesteramide Resin A

Hexahydrophthalic anhydride (308 g), di-isopropanol amine (393), lauric acid (200 g) and versatic-10-acid (181 g) were added to a reactor and reacted as described in Example 3 to obtain a polyester amide resin (70% solids) which had an acid value less than 3 mg KOH/g.

COMPARATIVE EXAMPLE B

Preparation of Polyesteramide Resin B

Hexahydrophthalic anhydride (311 g), di-isopropanol amine (397), lauric acid (118 g) and versatic-10-acid (247 g) were added to a reactor and reacted as described in Example 3 to obtain a polyester amide resin (70% solids) which had an acid value less than 3 mg KOH/g.

Two Component Coating Composition Comprising Resin

The polyesteramide resins of each the above examples (Ex 1 & 2 and Comp A & B) was mixed with 0.2% dibutyl tin dilaurate (a catalyst) and Tolonate HDT LV (a crosslinking compound from Perstorp) in an equal hydroxyl-isocyanate molar ratio. After flash off, curing was carried out by means of 30 minutes at 50° C., followed by cure at room temperature (approximately 21° C.).

Table 1 below describes the characteristic parameters determined for the polyesteramide resin of the above examples and for the two component coating composition comprising such resin.

TABLE 1

| | Ex 1 | Ex 2 | Comp A | Comp B |
|---|---|---|---|---|
| Properties of pure polyesteramide resin | | | | |
| Tg (° C.) | −27 | −17 | 5 | 13 |
| Ratio a):b) | 1:2 | 1:2 | 1:1.5 | 1:1.5 |
| Type of ester end groups (I) | L, V10 | L, V10 | L, V10 | L, V10 |
| OH functionality | 2.1 | 2.5 | 3.0 | 3.0 |
| OH value (mg KOH/g) | 137 | 172 | 126 | 123 |
| Mn (calculated) | 741 | 663 | 1052 | 1040 |
| Viscosity at 50° C. (Pas) | 10 | NM | >100 | >100 |
| Viscosity in butyl acetate (70% solids) at 21° C. (mPas) | 110 | 93 | 900 | >900 |
| Properties of the two component coating composition | | | | |
| Viscosity (s) DIN cup test | 17 | 17 | 17 | 16 |
| VOC (g/l) | 370 | 400 | 445 | 454 |
| Potlife (s) Initial | 17 | 17 | 17 | 16 |
| Potlife (s) after 30 minutes | 21 | 32 | 18 | 17 |
| Potlife (s) after 60 minutes | 31 | 51 | 19 | 18 |
| Hardness (s) direct after cure | 51 | 73 | 35 | 34 |
| Hardness (s) after 1 day | 69 | 104 | 136 | 114 |
| Tackiness directly after curing | 1 | 0 | 2 | 3 |

Footnote
(1) L = lauric acid V10 = versatic-10-acid
NM = not measured

TABLE 2

| Properties of the two component coating composition | URALAC |
|---|---|
| Viscosity (s) DIN cup test | 27 |
| VOC (g/l) | 420 |
| Potlife (s) Initial | 27 |
| Potlife (s) after 30 minutes | 68 |
| Potlife (s) after 60 minutes | Gel |
| Hardness (s) direct after cure | 81 |
| Hardness (s) after 1 day | 119 |
| Tackiness directly after curing | 0 |

The invention claimed is:

1. A polyesteramide resin containing ester groups and at least one amide group in the backbone characterized in that the resin has a Tg <0 ° C. and at least one hydroxyalkylamide endgroup having the structure I

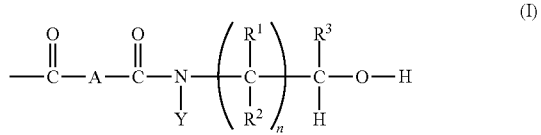

wherein the free bond extends to the polymer backbone;
A is an, optionally substituted, ($C_6$-$C_{24}$) aryldiradical or an, optionally substituted ($C_2$-$C_{24}$) (cyclo)alkyl aliphatic diradical;

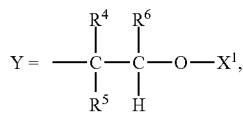

H or ($C_1$-$C_{20}$) (cyclo) alkyl,
or ($C_6$-$C_{10}$) aryl;
$X^1$ is H or a group —CO—$R^7$, —CO-A-CO—N($R^8$,$R^9$), —CO-A-CO—$OR^{10}$, or —NHet;
$R^1$ to $R^6$ are, independently of each other, H, ($C_1$-$C_{20}$) alkyl, ($C_3$-$C_7$) cycloalkyl or ($C_6$-$C_{10}$) aryl;
$R^7$ is ($C_1$-$C_{20}$) alkyl, ($C_3$-$C_7$) cycloalkyl, ($C_6$-$C_{10}$) aryl, or a radical of a polymer or an oligomer;
$R^8$ and $R^9$ are, independently of each other, ($C_1$-$C_{20}$) alkyl or ($C_6$-$C_{10}$) aryl groups; or ($C_1$-$C_{20}$) alkyl or ($C_6$-$C_{10}$) aryl groups substituted by a group containing at least one hetero atom or $R^8$ and $R^9$ together with the nitrogen atom to which they are attached form a 5 or 6 membered ring wherein optionally one or several C-atoms are replaced by —NH, —N—($C_1$-$C_{20}$) alkyl, —N-aryl, —O— or —S—;
$R^{10}$ is ($C_1$-$C_{20}$) alkyl, ($C_3$-$C_7$) cycloalkyl or ($C_6$-$C_{10}$) aryl, or a radical of a polymer or an oligomer;
—NHet is a mono-, bi- or multicyclic nitrogen containing heterocyclyl group attached via a nitrogen atom to the polymer which may be aromatic or partly or completely hydrogenated and may contain additional heteroatoms such as nitrogen, oxygen or sulfur and which may optionally be substituted;
n is an integer of 1 to 4, preferably n =1;
wherein that no more than one of $X^1$ and $X^2$ is H, ($C_1$-$C_{20}$) alkyl, ($C_3$-$C_7$) cycloalkyl or ($C_6$-$C_{10}$) aryl; and
wherein nitrogen containing groups may be quaternized or protonated; and wherein
the polyesteramide resin comprises:
a) at least a diacid and/or anhydride;
b) at least an alkanolamine, and
c) functional end groups different than OH groups, provided by at least one component being a fatty acid selected from the list consisting of octanoic, isononanoic, decanoic, lauric, versatic -5 acid, versatic -10 acid and mixtures thereof,
wherein the a):b) equivalent ratio is from 1.0:1.0 and 1.0:3; and wherein
the polyesteramide resin also comprises at least a functionality selected from the group consisting of carboxylic acid groups, ester groups, polyethylene oxide groups, polypropylene oxide groups, amine groups, tertiary amine groups, quaternary amine groups, cyclic groups, heterocyclic groups, phenolic groups and mixtures thereof.

2. A polyesteramide resin according to claim 1 having a functionality of reactive groups of from 2 to 6.

3. A polyesteramide resin according to claim 1, wherein Mn ≤2000 Da.

4. A polyesteramide resin according to claim 1, wherein in the state of 100% solids the viscosity of the polyesteramide resin is ≤150 Pas at 50 ° C.

5. A polyesteramide resin according to claim 1 having an OH value from 120 to 180 mg KOH/g.

6. A polyesteramide resin according to claim 1 diluted with a liquid medium, wherein the liquid medium is selected from the group consisting of organic solvents, water and mixtures thereof.

7. A polyesteramide resin according to claim 1, wherein the polyesteramide resin has a viscosity dissolved as 70 wt % solids in a liquid medium which is <800 mPas at room temperature.

8. A process for making the polyesteramide resin according to claim 1, comprising the steps:
i) reacting at least a diacid and/or its anhydride a) with at least a dialkanolamine b);
ii) performing a polycondensation reaction of the resulting monomers; and
iii) optionally adding (before or after step ii) of the polycondensation reaction), component c) to take part in the polycondensation.

9. A binder composition comprising the polyesteramide resin according to claim 1 and optionally at least one other resin.

10. A binder composition according to claim 9 wherein the other resin is at least one resin selected from the group consisting of acrylic resins and polyester resins.

11. A two component coating composition comprising:
A) a first component being a binder composition according to claim 9 and
B) a second component being at least a crosslinking compound that is capable of reacting with hydroxyl and/or other functional groups of the polyesteramide resin; and
C) optionally a catalyst.

12. A two component coating composition according to claim 11 comprising less than 500 g/l of volatile organic solvent based on the total composition.

13. A method for applying a coating composition to a substrate or article, the method comprising applying a coating of the coating composition according to claim 11 to the substrate or article by spraying, knife-coating, brushing, dipping, rolling, flow coating, roller coating.

14. A coating obtained by curing a two component coating composition according to claim 11.

15. A coated substrate or article which comprises a film coating of the two component coating composition according to claim 11 applied onto at least a part of the substrate or article.

16. A two component coating composition which comprises the polyesteramide resin according to claim 1 as one component thereof.

17. An adhesive or sealing composition which comprises the polyesteramide resin according to claim 1.

18. A polyesteramide resin according to claim 7, wherein the viscosity of the polyesteramide resin dissolved as 70 wt % solids in a liquid medium is <400 mPas, at room temperature.

* * * * *